(12) United States Patent
Dobbs

(10) Patent No.: US 6,758,512 B2
(45) Date of Patent: Jul. 6, 2004

(54) WINDOW FRAME STUD

(76) Inventor: Alan Dobbs, 4171 Bluebonnet Dr., Stafford, TX (US) 77477

( * ) Notice: Subject to any disclaimer, the term of this patent is extended or adjusted under 35 U.S.C. 154(b) by 8 days.

(21) Appl. No.: 10/210,351

(22) Filed: Aug. 1, 2002

(65) Prior Publication Data
US 2004/0021343 A1 Feb. 5, 2004

(51) Int. Cl.$^7$ .............................. B60J 1/08; F16B 35/00
(52) U.S. Cl. ..................................... 296/146.5; 411/389
(58) Field of Search ................................. 411/389, 424, 411/426; 296/146.2, 201, 146.5

(56) References Cited

U.S. PATENT DOCUMENTS

| 2,161,740 A | * | 6/1939 | Eksergian |
| 2,844,409 A | * | 7/1958 | Eksergian |
| 3,408,887 A | * | 11/1968 | Villo |
| 4,636,125 A | * | 1/1987 | Burgard |
| 4,854,311 A | * | 8/1989 | Steffee |
| 5,333,978 A | * | 8/1994 | Rives |
| 5,669,592 A | * | 9/1997 | Kearful |
| 6,036,256 A | * | 3/2000 | Hilliard |

* cited by examiner

Primary Examiner—Flemming Saether
(74) Attorney, Agent, or Firm—David M. O'Brian

(57) ABSTRACT

The present invention relates to an improved window frame stud used for affixing a removable window frame to a vehicle door panel. The improved window frame stud being constructed of a one-piece, unitary, high-strength, low corrosive material and including a tapered grip-portion for use with a standard size metric and/or SAE size wrench or pliers in the absence of damaging the window frame stud. The present invention has particular application for use with off-road and/or sport utility vehicles having the option to conveniently remove the window frame(s) from the door panel.

13 Claims, 2 Drawing Sheets

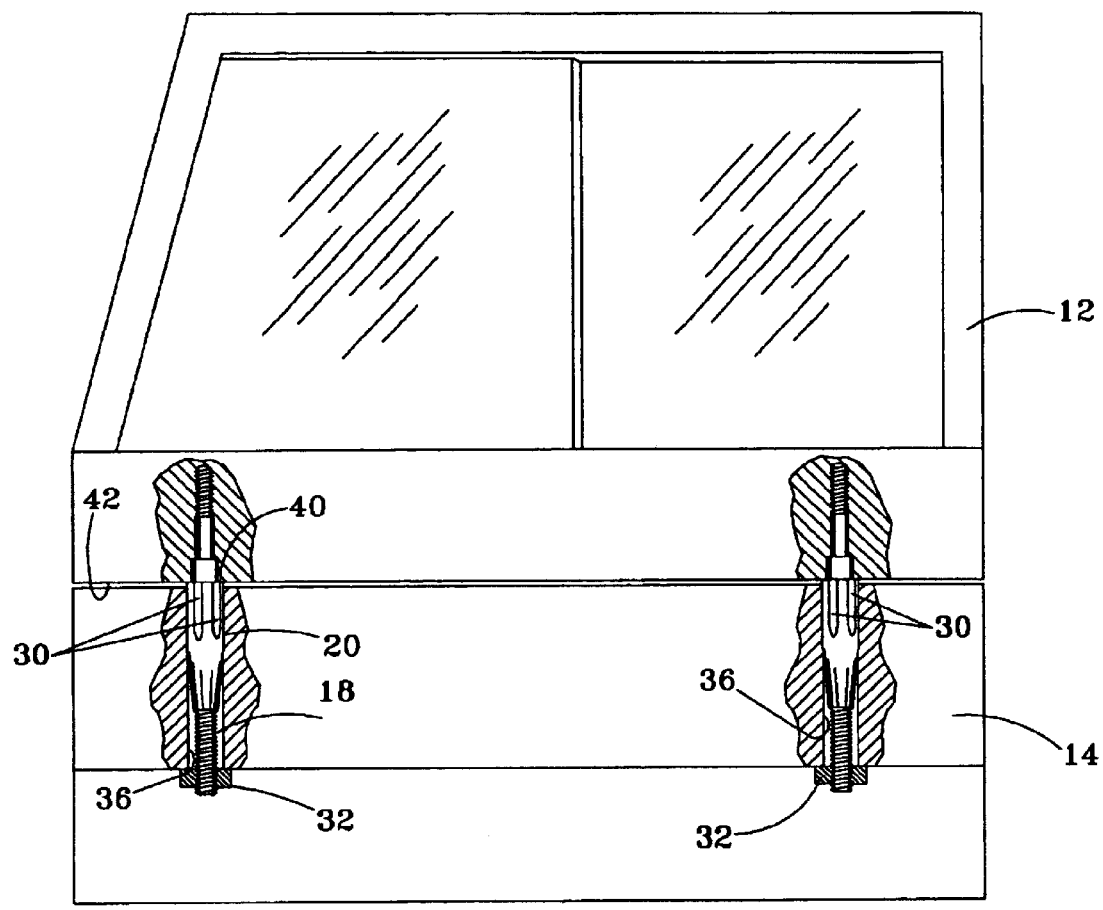
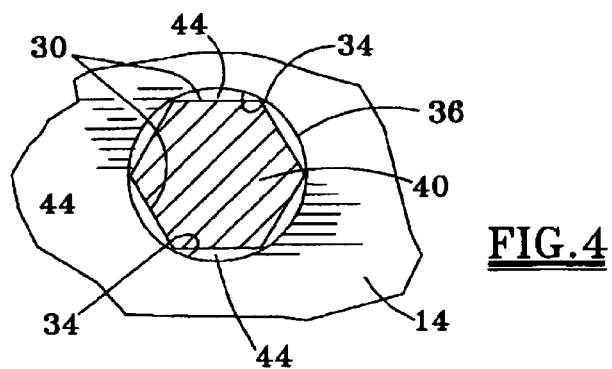
FIG.3
FIG.4

WINDOW FRAME STUD

FIELD OF THE INVENTION

The present invention relates generally to an improved support and securing device for affixing a removable window frame to a vehicle door panel.

BACKGROUND OF THE INVENTION

In many vehicles, including sport utility vehicles, the driver's side window frame and the passenger's side window frame are designed to be removable. The purpose for having removable window frames on a sport utility vehicle include, but are not limited to, allowing for better interior ventilation, improving and/or changing the style or look of the vehicle and to avoid breakage or rattling of the window glass during off-road competition, racing, and during other rigorous activities. While there are several varieties of vehicles, including sport utility vehicles, which have removable window frames, the Defender model sport utility vehicle, manufactured by Land Rover® includes removable driver's side and passenger's side window frames employing a stud-type window mount. Normally, there are two window studs used per window frame and door panel engagement. The factory-equipped window stud for the Defender model is a two-piece combination, consisting of a cylindrical shaft member having two threaded, disposed ends and a cylindrical-shaped spacer or bushing member encircling and attached to the central portion of the shaft member. The shaft member of the factory-equipped window stud generally consists of a low grade, malleable base metal, which is prone to rust and corrosion. The spacer member of the factory-equipped window stud generally consists of a thin polymer material. The spacer member is intended to provide a snug fit for the factory-equipped window stud while it is secured within the retaining hole of the vehicle door panel. Additionally, the spacer member is impossible to grip using a wrench and normally requires the use of a pair of pliers, etc., since its surface has no ridges or flat surfaces to grip. In many instances, after only a few removals and re-installations of the window frame using the factory-equipped window stud, the spacer portion may become "chewed," "gnawed" and/or "gauged" from the user having to employ pliers, etc., to grip the spacer portion to loosen the securing nut from the shaft member. Moreover, the shaft member generally becomes difficult to use over time, as the spacer member can adhere to the internal surface of the receiving hole, thereby collecting water and debris which promotes rust and corrosion of the shaft member. Further the factory-equipped shaft member easily deforms, making alignment of the two shaft members with the receiving holes, a difficult task. Adding to the alignment problem of the shaft member with the receiving holes in the door panel, is the problem of the cylindrical spacer member being designed to fit snugly with little or no tolerance for horizontal movement with the receiving holes. When the shaft members become bent or otherwise deformed, the cylindrically-shaped spacer members also move out of alignment, making the simultaneous fit of both factory-equipped window studs within their respective door panel receiving holes, difficult at best.

The present invention overcomes the drawbacks of the known device, by providing an improved one-piece window frame stud having an improved design and constructed of a superior material which overcomes the deficiencies of the factory-equipped window stud.

Although the need for an improved one-piece window frame stud has been long felt, the prior art, heretofore, has not provided such a product which meets all of the aforementioned criterion.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features and advantages in accordance with the purpose of the invention as embodied and broadly described herein, an improved window frame stud for affixing a removable window frame to a vehicle door is provided. The improvements of the present invention generally include, but are not limited to, a one-piece, unitary shaft member having a first threaded end, a mid-portion and a second threaded end. The mid-portion further includes a tapered portion adjacent to the first threaded end and a collar portion adjacent to the second threaded end. The mid-portion also includes a grip member having two or more axially opposed flat sides positioned circumferentially on the grip member. The two or more flat sides facilitate gripping of the unitary shaft member using a wrench, while selectively tightening or loosening the retaining nut in threaded attachment with the first threaded end of the shaft member. The mid-portion of the improved window frame stud may, for example, include at least six axially opposed flat sides positioned circumferentially on the grip member for greater ease in gripping the window frame stud. The tapered portion and the multi-sided grip portion of the mid-portion are designed to make firm contact with the internal surfaces of the retaining holes of the door panel, in the absence of completely blocking the retaining holes to allow for the passage of water and debris. The collecting of water and debris in the retaining holes, promotes rust and corrosion of the window frame stud and retaining nut and creates adhesion between the window frame stud and the receiving hole in the window frame and the receiving hole in the door panel, making removal and replacement of the window frame difficult. The unitary shaft member may for example be composed of stainless steel to reduce the incidence of rust and/or corrosion, and having a hardness of 76 Rockwell B to reduce the incidence of bending and/or deformation.

It is an object of the present invention to provide an improved window frame stud for affixing a removable window frame to a vehicle door consisting of a unitary shaft member comprised of a material that is resistant to rust and corrosion.

Another object of the present invention is to provide an improved window frame stud for affixing a removable window frame to a vehicle door consisting of a unitary shaft member comprised of a material that is resistant to bending and/or deformation.

Yet another object of the present invention is to provide an improved window frame stud for affixing a removable window frame to a vehicle door without the need for a spacer or bushing member.

Still another object of the present invention is to provide an improved window frame stud for affixing a removable window frame to a vehicle door wherein the alignment of the window studs within the retaining holes is improved through the use of a tapered portion of the grip member.

Another object of the present invention is to provide an improved window frame stud for affixing a removable window frame to a vehicle door wherein the grip portion is compatible for use with a wrench.

Yet another object of the present invention is to provide an improved window frame stud for affixing a removable window frame to a vehicle door in the absence of sealing the receiving holes within the door panel, thereby avoiding the accumulation of debris and water in the receiving holes.

BRIEF DESCRIPTION OF THE DRAWINGS

The accompanying drawings which are incorporated into and constitute a part of this specification, illustrate a preferred embodiment of the invention and together with a general description of the invention given above and the detailed description of the preferred embodiment given below serve to explain the principals of the invention.

FIG. 3 is a partial cut-away view, of a preferred embodiment improved window frame stud for affixing a removable window frame to a vehicle door panel, illustrating the relationship of the improved window stud with the window frame and the door panel of the vehicle.

FIG. 4 is a plan view of a preferred embodiment improved window frame stud for affixing a removable window frame to a vehicle door panel in operative engagement with the receiving hole of the door panel.

DETAILED DESCRIPTION OF THE INVENTION

Figures 1, 2:
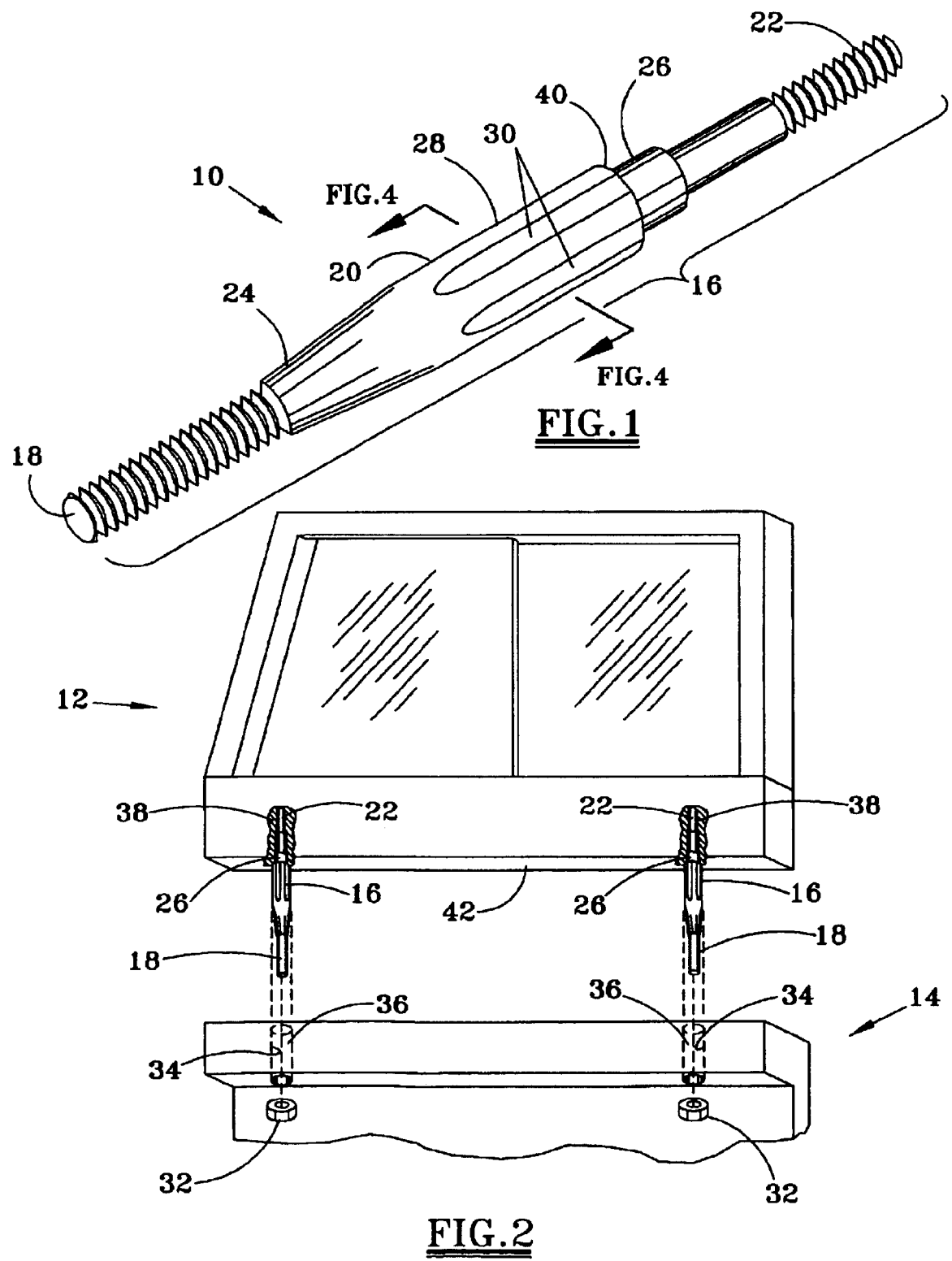
FIG. 1 is a perspective view of an improved window frame stud for affixing a removable window frame to a vehicle door panel, illustrating the preferred embodiment of the present invention.
FIG. 2 is a partial cut-away view and partial exploded view, of a preferred embodiment improved window frame stud for affixing a removable window frame to a vehicle door panel, illustrating the relationship of the improved window stud with the window frame and the door panel of the vehicle.

With reference to the drawings wherein like parts are designated by like numerals, FIGS. 1–4 illustrate various views of the preferred embodiment improved window frame stud 10 for affixing a removable window frame 12 to a vehicle door panel 14. The improved window frame stud 10 is composed of a one-piece, unitary shaft member 16 having a first disposed threaded end 18, a mid-portion 20 and a second disposed threaded end 22. The mid-portion 20 further includes a tapered portion 24 adjacent to the first threaded end 18 and a collar portion 26 adjacent to the second threaded end 22. The mid-portion 20 also includes a grip member 28 having two or more axially opposed flat sides 30 positioned circumferentially on the grip member 28. The two or more flat sides 30 facilitate gripping of the unitary shaft member 16 using a wrench (not shown), while selectively tightening or loosening the retaining nut 32 in threaded attachment with the first threaded end 18 of the shaft member 16. The mid-portion 20 of the improved window frame stud 10 may, for example, include at least six axially opposed flat sides 30 positioned circumferentially on the grip member 28 for greater ease in gripping the window frame stud 16. The tapered portion 24 and the multi-sided grip portion 28 of the mid-portion 20 are designed to make firm contact with the inner diameter surface 34 of the retaining holes 36 of the door panel 14, in the absence of completely blocking the retaining holes 36 to allow for the passage of water and debris. Over time and especially when exposed to weather such as snow, rain and wind, water and debris will enter the retaining holes 36. The accumulation of water and debris in the retaining holes 36, promotes adhesion, rust and corrosion of the factory-equipped window frame stud (not shown) and retaining nut 32. The unitary shaft member may for example be composed of stainless steel to reduce the incidence of rust and/or corrosion, and may for example, have a hardness of 76 Rockwell B to reduce the incidence of bending and deformation.

OPERATION

As depicted in FIG. 2, the second disposed threaded end 22 of the shaft member 16 is first threadedly engaged to a threaded receiving hole 38 in the window frame 12. A metric and/or SAE size wrench (not shown) is typically used to engage the flat sides 30 of the grip portion 28 to turn the shaft member 16 to threadedly affix the second threaded end 22 with the threaded receiving hole 38. The second threaded end 22 is threadedly received within the threaded receiving hole 38 until the collar portion 26 is securely retained within the receiving hole 38 and a shoulder 40 of the grip portion 20 is secured against the bottom edge 42 of the window frame 12. The above-identified steps are performed for both shaft members 16, before attaching the shaft members 16 to the door panel 14.

After both shaft members 16 are securely affixed within the receiving holes 38 of the window frame 12, the first disposed threaded ends 18 of the shaft members 16 are then aligned with the receiving holes 36 of the door panel 14. The diameter of the first threaded ends 18 are smaller in comparison to the diameter of the receiving holes 36 of the door panel 14, which facilitates the initial penetration of the first threaded ends 18 within the receiving holes 36. The tapered portion 24 further facilitates the continued insertion of the mid-portion 20 within the receiving holes 36, by allowing for the gradual, increased snug fit of the mid-portion 20 within the receiving holes 36. Use of the tapered portion 24, provides for skewing and self-guiding, which in turn allows for greater tolerance in the movement of the shaft members 16 during insertion into the receiving holes 36 while obviating the necessity that the shaft members 16 be precisely aligned with the receiving holes 36, unlike the factory-equipped window stud (not shown).

As viewed in FIG. 3, when the shaft member 16 is fully engaged with the door panel 14, the mid-portion 20 and the first threaded ends 18 are retained within the receiving holes 36. The retaining nuts 32 are then threadedly attached to the first threaded ends 18 wherein the window frame 12 becomes fully affixed to the door panel 14 using the present invention 10. The diameter of the retaining nuts 32 is larger than the diameter of the receiving holes 36, thus upon full engagement of the retaining nuts 32 with the first threaded end 18, as depicted in FIG. 3, tension is created on the shaft member 16 to secure the window frame 12 to the door panel 14. As further depicted in FIG. 4, the flat surfaces 30 do not contact the inner surfaces 34 of the receiving holes 36 leaving a gap 44 through which water and debris may pass to reduce the incidence of corrosion, rust and adhesion between the shaft member 16 and the receiving hole 36. To protect and prolong the usefulness of the threaded ends 18, 22 of the shaft member 16, a lubricant should be used on the threaded ends 18, 22 when the window frame 12 is removed and re-installed to the door panel 14.

It will be appreciated that these and other embodiments may be provided for improving a window stud apparatus used to secure a window frame to a door panel used in various types of vehicles, including sport utility vehicles and off-road vehicles. Additional embodiments become readily apparent in view of the present invention as described herein above. Having described the invention above various modifications of the techniques, procedures and materials will be apparent to those skilled in the art. It is intended that all such variations within the scope and spirit of the appended claims be embraced thereby.

What is claimed is:

1. An improved window frame stud for affixing a removable window frame to a vehicle door, comprising:
   a unitary shaft member for affixing the removable window frame to the vehicle door;
   a first disposed threaded end of said unitary shaft member for reception within a retaining hole in the vehicle door wherein an outer diameter of said first disposed threaded end is smaller as compared to an inner diameter of the retaining hole in the vehicle door, thereafter said first disposed threaded end partially protrudes from the retaining hole to engage a threaded retaining nut to secure said first disposed threaded end of said shaft member within the retaining hole of said vehicle door;
   a second disposed threaded end of said unitary shaft member being positioned axially opposite of said first disposed threaded end, said second disposed threaded end being designed for threaded engagement within a threaded receiving hole in the window frame, to secure said second disposed threaded end of said unitary shaft member within said window frame; and
   a mid-portion of said unitary shaft member said mid-portion being axially positioned between said first disposed threaded end portion and said second disposed threaded end portion, wherein said mid-portion has a diameter larger than said first and second threaded ends and includes a plurality of axially aligned flat sided circumferential surfaces, said flat sided circumferential surfaces being retained within the retaining hole of the vehicle door, wherein the diameter said mid-portion is smaller than the inner diameter of the retaining hole such that when the first disposed threaded end portion is in full threaded engagement with the threaded retaining nut, the plurality of flat sided circumferential surfaces generally avoid contact with an inner diameter surface of the retaining hole, thereby creating a plurality of continuous axial gaps between the plurality of axially aligned flat sided circumferential surfaces and the inner diameter surface of the retaining hole to allow for the escape of water and debris through said retaining hole to generally avoid the incidence of corrosion, rust and adhesion between said unitary shaft member and the retaining hole of the vehicle door.

2. The improved window frame stud, as defined in claim 1, wherein said mid-portion further comprises a tapered portion located between the plurality of flat sided circumferential surfaces and said first disposed threaded end portion of said unitary shaft member.

3. The improved window frame stud, as defined in claim 2, wherein said mid-portion further comprises a collar portion located between the plurality of flat sided circumferential surfaces and said second disposed threaded end portion of said unitary shaft member.

4. The improved window frame stud, as defined in claim 3, wherein the plurality of flat sided circumferential surfaces further comprise a grip member disposed between said tapered portion and said collar portion.

5. The improved window frame stud, as defined in claim 4, wherein the tapered portion of said mid-portion provides improved alignment for engaging the removable window frame to the vehicle door.

6. The improved window frame stud, as defined in claim 5, wherein the unitary shaft member is comprised of stainless steel.

7. An improved window frame stud for affixing a removable window frame to a vehicle door, comprising:
   a unitary shaft member, said shaft member having a first disposed, flat-ended, v-groove threaded end for engagement within a retaining hole in the vehicle door, said first disposed v-groove threaded end being secured within the retaining hole via the v-groove threaded engagement of the first disposed v-groove threaded end and a v-groove threaded retaining nut, a second disposed, flat-ended, v-groove threaded end for v-groove threaded engagement to a v-groove threaded receiving hole in the removable window frame, and
   a mid-portion of said unitary shaft member, said mid-portion being positioned between the first disposed v-groove threaded end and the second disposed v-groove threaded end, wherein said mid-portion has a diameter larger than said first and second threaded ends and includes a means for receiving a tool, said mid-portion is also retained within the retaining hole in the vehicle door, wherein said mid-portion generally avoids contact with an inner diameter surface of the retaining hole in the vehicle door, to allow for the unrestricted passage of water and debris through said retaining hole of the vehicle door to reduce the incidence of corrosion, rust and adhesion between said unitary shaft member and the retaining hole.

8. The improved window frame stud, as defined in claim 7, wherein said mid-portion further comprises a tapered portion adjacent to the first disposed v-groove threaded end.

9. The improved window frame stud, as defined in claim 8, wherein said mid-portion further comprises a collar portion adjacent to the second v-groove threaded disposed end, said collar portion being retained within the receiving hole in the removable window frame.

10. The improved window frame stud, as defined in claim 9, wherein said mid-portion further comprises a grip member disposed between said tapered portion and said collar portion.

11. The improved window frame stud, as defined in claim 10, wherein the grip member of the mid-portion preferably includes at least two circumferentially opposed, flat sides for mating engagement with a tool.

12. The improved window frame stud, as defined in claim 11, wherein the grip member of the mid-portion preferably includes at least six circumferentially opposed, flat sides for mating engagement with a wrench.

13. An improved window frame stud for affixing a removable window frame to a vehicle door, comprising:
   a first disposed, flat-ended, v-groove threaded end of said window frame stud for reception within a retaining hole in the vehicle door wherein an outer diameter of said first disposed v-groove threaded end is smaller as compared to an inner diameter of the retaining hole in the vehicle door, thereafter a tip end of said first disposed v-groove threaded end partially protrudes from a lower end of the retaining hole to engage a v-groove threaded retaining nut to secure said first disposed v-groove threaded end of said window frame stud within the retaining hole of said vehicle door;
   a second disposed, flat-ended, v-groove threaded end of said window frame stud being positioned axially opposite of said first disposed v-groove threaded end, said second disposed v-groove threaded end being designed for threaded engagement within a v-groove threaded receiving hole in the window frame, to secure said second disposed v-groove threaded end of said window frame stud within said window frame; and a mid-portion of said window frame stud, said mid-portion being axially positioned between said first disposed v-groove threaded end portion and said second disposed v-groove threaded end portion, wherein said mid-portion has a diameter larger than said first and second threaded ends and includes a plurality of axially aligned flat sided circumferential surfaces, said flat sided circumferential surfaces being completely retained within the retaining hole of the vehicle door, wherein the diameter the plurality of axially aligned flat sided circumferential surfaces is smaller than the inner diameter of the retaining hole such that when the first disposed v-groove threaded end portion is in full threaded engagement with the v-groove threaded retaining nut, the plurality of flat sided circumferential surfaces generally avoid contact with an inner diameter surface of the retaining hole, thereby creating a plurality of continuous axial gaps between the plurality of axially aligned flat sided circumferential surfaces and the inner diameter surface of the retaining hole to allow for the escape of water and debris through said retaining hole to generally avoid the incidence of corrosion, rust and adhesion between said window frame stud and the receiving bole of the vehicle door.

* * * * *